US008130856B1

(12) United States Patent
Mansour

(10) Patent No.: US 8,130,856 B1
(45) Date of Patent: Mar. 6, 2012

(54) ADJUSTABLE TRANSMIT DIVERSITY

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 1526 days.

(21) Appl. No.: 11/375,052

(22) Filed: Mar. 15, 2006

(51) Int. Cl.
*H04B 7/02* (2006.01)

(52) U.S. Cl. ........ 375/267; 375/133; 375/134; 375/141; 375/135; 375/146; 375/299; 455/100; 455/102; 455/103; 455/105; 455/115.3; 455/70; 455/61; 455/69; 455/703

(58) Field of Classification Search ........... 375/133, 375/134, 141, 267, 135, 146, 299; 455/456.5, 455/524, 525, 560, 562.1, 100, 102, 103, 455/105, 115.3, 56, 61, 69, 703, 70
See application file for complete search history.

(56) References Cited

U.S. PATENT DOCUMENTS

| 5,542,107 | A * | 7/1996 | Kay | 455/513 |
| 5,630,223 | A * | 5/1997 | Bahu et al. | 455/296 |
| 6,044,276 | A * | 3/2000 | Goldberg et al. | 455/503 |
| 6,496,498 | B1 * | 12/2002 | Kockmann et al. | 370/347 |
| 6,681,115 | B1 * | 1/2004 | McKenna et al. | 455/517 |
| 6,788,661 | B1 * | 9/2004 | Ylitalo et al. | 370/334 |
| 6,898,441 | B1 * | 5/2005 | Kogiantis et al. | 455/562.1 |
| 7,327,811 | B2 * | 2/2008 | Molnar | 375/344 |
| 7,603,140 | B2 * | 10/2009 | Chen et al. | 455/562.1 |
| 2002/0085502 | A1 * | 7/2002 | Chheda et al. | 370/252 |
| 2002/0115473 | A1 | 8/2002 | Hwang et al. | |
| 2002/0198026 | A1 | 12/2002 | Niemela | |
| 2004/0152491 | A1 | 8/2004 | Lobinger et al. | |
| 2005/0085197 | A1 | 4/2005 | Laroia et al. | |
| 2005/0195924 | A1 * | 9/2005 | Chen et al. | 375/343 |
| 2006/0165008 | A1 * | 7/2006 | Li et al. | 370/252 |

OTHER PUBLICATIONS

Shapira, Joseph, "Cost-Effective Optimization of Mobile Communications for Developing Economies," obtained from Internet on Jan. 26, 2006 at http:\rp.iszf.irk.rulhawk/ursi2005/pdf/c01.(01700).pdf.

* cited by examiner

*Primary Examiner* — Khanh C Tran
*Assistant Examiner* — Rahel Guarino

(57) ABSTRACT

Systems and methods for adjustable transmit diversity (adjustable PSTD) are provided. A base station transmits information to a mobile station over two antennas. Using information received from the mobile station related to channel conditions, the base station can adjust a frequency offset between the information transmitted over the two antennas.

17 Claims, 3 Drawing Sheets

ADJUSTABLE TRANSMIT DIVERSITY

BACKGROUND OF THE INVENTION

Wireless communications occur in a less than ideal environment. There may be many sources of interference and/or physical obstacles between transmitters and receivers. Various techniques are employed in wireless communication networks to address these problems. One technique for addressing these problems is the use of transmit diversity. Transmit diversity involves sending the same or similar information from first and second antennas. Transmit diversity can be achieved by placing the second antenna at a different location (spatial diversity) at a distance from the first antenna, transmitting information from two antennas coupled to the same base station, transmitting using different antenna polarizations (polarization diversity), transmitting at different times (time diversity), transmitting at different phases (phase diversity) and/or transmitting at different frequencies (frequency diversity).

SUMMARY OF THE INVENTION

Phase sweeping transmit diversity (PSTD) is a diversity technique in which the same information is transmitted over two or more antennas with a small frequency offset, commonly referred to as the sweeping frequency spacing. This technique creates an artificial fading, which occurs at a rate recoverable by the interleaver of the decoder at the receiver. While PSTD is effective when fading occurs, it raises the signal energy to total power spectral energy (Ec/Io) when used for non-fading channels. Conventionally PSTD is performed with a fixed sweeping frequency spacing, which raises the Ec/Io for non-fading channels, and in turn, reduces network capacity.

The present invention overcomes the above-identified and other deficiencies of conventional systems by adjusting transmit diversity. Specifically, the sweeping frequency spacing between two antennas is adjusted based upon measurements. When the measurements indicate that fading and/or other impairments is occurring in the transmission path, the sweeping frequency spacing is increased. When the measurements indicate that fading and/or other impairments are not affecting the transmission path, the sweeping frequency spacing is decreased or eliminated.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
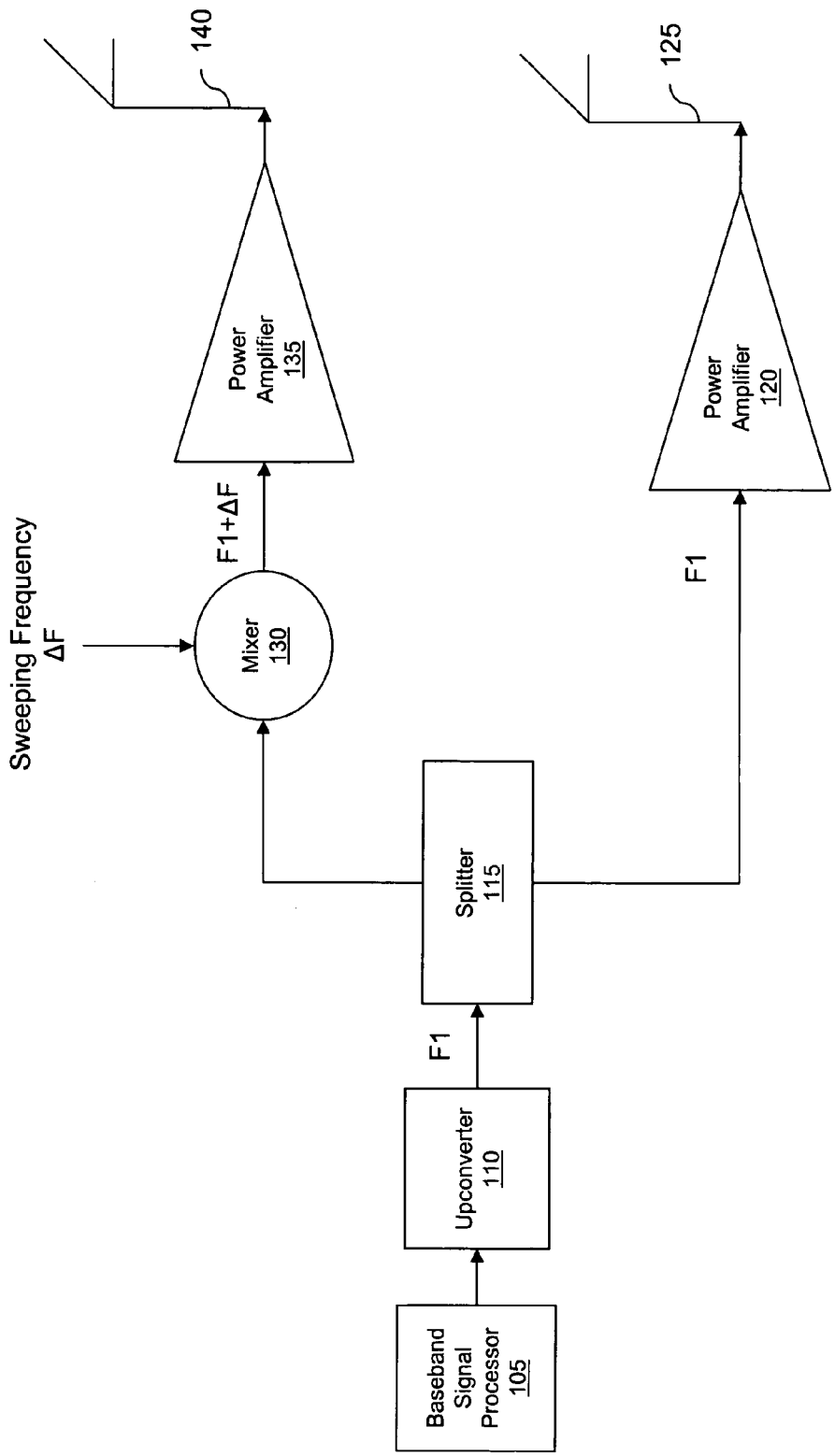
FIG. 1 is a schematic diagram of a conventional base station for implementing PSTD.

FIG. 1 is a schematic diagram of a conventional base station for implementing PSTD. Communication signals are output from baseband signal processor 105 to upconverter 110. Upconverter 110 upconverts the baseband signals to a transmission frequency F1, and provides the upconverted signals to splitter 115. Splitter 115 splits the upconverted signal into two signal paths. In the first signal path the upconverted signal is supplied to power amplifier 120 and transmitted over antenna 125 at frequency F1. In the second signal path the upconverted signal is supplied to mixer 130, which mixes the upconverted signal with a sweeping frequency $\Delta F$. Mixer 130 provides a signal at the frequency $F1+\Delta F$ to power amplifier 135, which then transmits the signal over antenna 140 at that frequency. Accordingly, the same signal is transmitted at two different frequencies. In PSTD the sweeping frequency $\Delta F$ is typically a small frequency value, such as 50 or 100 Hz, and is a fixed value for transmissions.

Figure 2:
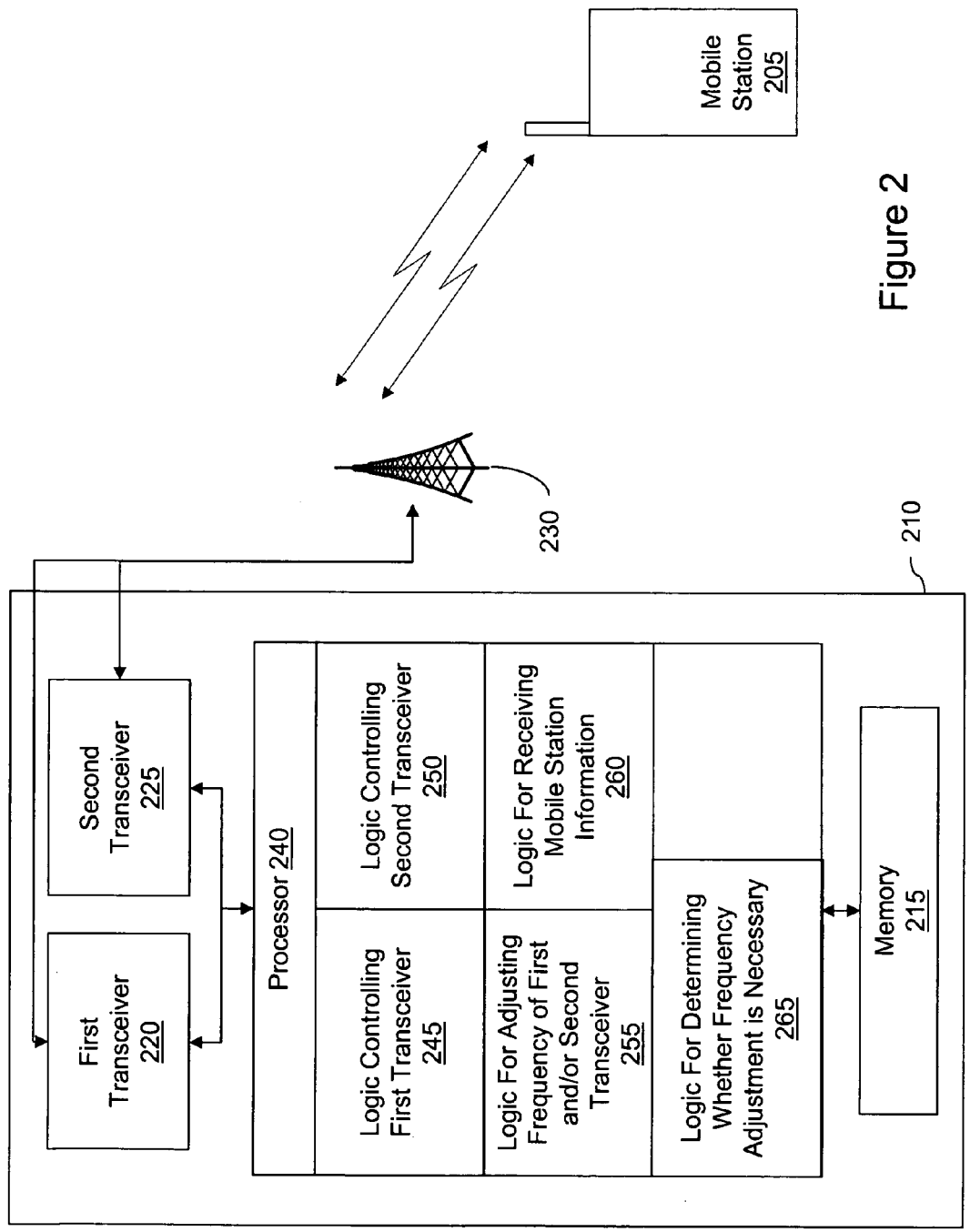
FIG. 2 is a block diagram of an exemplary system in accordance with the present invention.

FIG. 2 is a block diagram of an exemplary system in accordance with the present invention. The system includes mobile station 205 and base station 210, which can communicate using any type of multiple access technology, such as code division multiple access (CDMA). Mobile station 205 can be any type of mobile station including a wireless telephone, personal digital assistant (PDA), wireless computer and/or the like. Base station 210 includes memory 215, first and second transceivers 220 and 225, antenna tower 230 and processor 240. Memory 215 can be any type of memory including a read only memory, random access memory, flash memory, hard drive and/or the like. Transceivers 220 and 225 can be any type of transceiver appropriate for the particular system. Antenna tower 230 includes a number of antennas, two of which are employed for PSTD when communicating with a mobile station in accordance with the present invention.

Processor 240 can be any type of processor including a microprocessor, application specific integrated circuit (ASIC), field programmable gate array and/or the like. Processor 240 includes logic for controlling the first and second transceivers 245 and 250, logic for adjusting the frequency of the first and second transceivers 255, logic for receiving mobile station information 260 and logic for determining whether frequency adjustment is necessary 265, all of which will be described in more detail below in connection with FIG. 3. The various logic of processor 240 can be hardwired logic or can be a computer program loaded from memory 215. Although FIG. 2 illustrates the use of two transceivers 245 and 250, the present invention can also employ a single transceiver to provide the adjustable transmit diversity.

Figure 3:
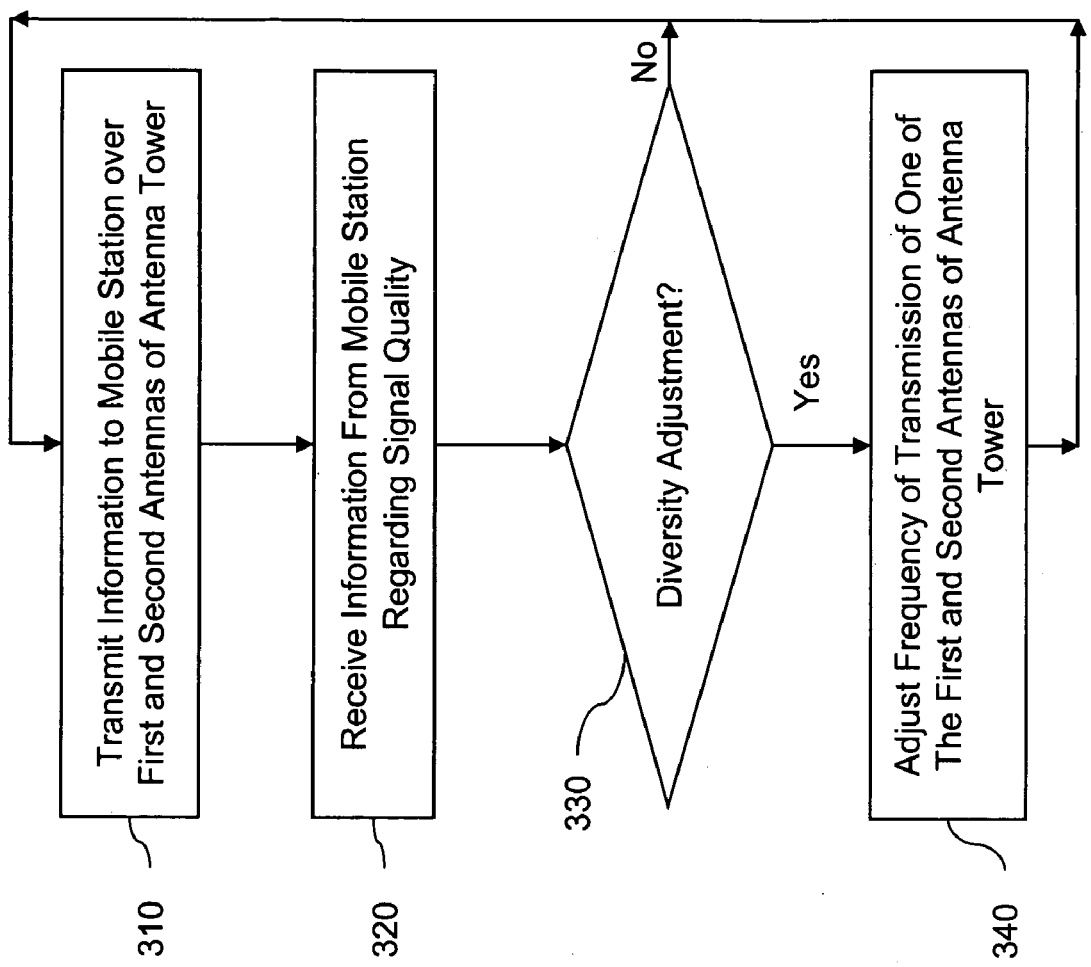
FIG. 3 is a flow diagram of an exemplary method in accordance with the present invention.

FIG. 3 is a flow diagram of an exemplary method in accordance with the present invention. Logic for controlling the first and second transceivers 245 and 250 control first and second transceivers 220 and 225 for transmitting information to mobile station 205 over the first and second antennas of antenna tower 230 (step 310). The information can be transmitted over the first and second antennas of antenna tower 230 at the same frequency or at a particular sweeping frequency offset, and the total power of the transmission over the two antennas can be the same amount of power used for transmission when a single antenna is employed. Logic for receiving mobile station information 260 receives information from mobile station 205 (step 320). This information provides base station 210 with some type of indication of the channel conditions being experienced by the mobile station. The information can be a frame error rate (FER), signal-to-noise ratio (SNR), signal energy to total power spectral energy (Ec/Io) and/or the dike. Additionally, or alternatively, the information can be power control information or commands from mobile station 205.

Using the information received from mobile station 205, logic for determining whether a frequency adjustment is necessary 265 determines whether to adjust the sweeping frequency offset between the information transmitted over the first and second antennas of antenna tower 230 (step 330). When no adjustment is necessary ("No" path out of decision step 330), then the base station continues to transmit information over the first and second antennas of antenna tower 230 at the same sweeping frequency offset (step 310). If, however, a diversity adjustment is required ("Yes" path out of decision step 330), then the logic for adjusting the frequency of the first and/or second transceivers 255 adjusts the sweeping frequency offset (step 340), and information is transmitted to the mobile station at the adjusted frequency (step 310).

It should be recognized that one advantage of the present invention is that the mobile station need not be aware of the frequency adjustment process. Specifically, information provided by the mobile station to the base station can be information already provided by the mobile station. Alternatively, base station can instruct the mobile station to send the information. Additionally, the present invention improves system performance according to changes in the environment between the base station and mobile station, where information about the environment is reported by the mobile station to the base station.

Although the present invention has been described in connection with two antennas, the present invention is equally applicable to base stations that employ more than two antennas. Although the present invention has been described in connection with one base station and one mobile station, the present invention can be employed by a base station to communicate with a number of mobile stations, and in a number of base stations in a network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a base station transmitting information to a mobile station, the method comprising the acts of:
   transmitting information over a first antenna to the mobile station at a first frequency;
   transmitting the information over a second antenna to the mobile station at a second frequency;
   receiving information from the mobile station related to signal quality; and
   adjusting a sweeping frequency of the transmission of information over one of the first and second antennas based on the received information;
   wherein the sweeping frequency is added to one of the first frequency and the second frequency, and the first and second frequency are within a single channel.

2. The method of claim 1, wherein the frequency of the transmission is adjusted by 50 or 100 Hertz.

3. The method of claim 2, wherein the information is transmitted over the first and second antennas at different frequencies.

4. The method of claim 1, wherein the information received from the mobile station is a frame error rate.

5. The method of claim 1, wherein the information received from the mobile station is a signal-to-noise ratio.

6. The method of claim 1, wherein the information is transmitted to the mobile station using code division multiple access transmission.

7. The method of claim 1, wherein the mobile station is not explicitly informed of the adjustment.

8. The method of claim 1, wherein the information is transmitted over the first antenna at a first frequency and the information is transmitted over the second antenna at the same first frequency.

9. A base station comprising:
   a first antenna;
   a second antenna; and
   a processor, the processor comprising:
      logic for controlling transmission of information over a first antenna to the mobile station at a first frequency;
      logic for controlling transmission of information over a second antenna to the mobile station at a second frequency;
      logic for receiving information from the mobile station related to signal quality; and
      logic for adjusting a sweeping frequency of the transmission of information over one of the first and second antennas based on the received information;
   wherein the sweeping frequency is added to one of the first frequency and the second frequency, and the first and second frequency are within a single channel.

10. The base station of claim 9, wherein the frequency of the transmission is adjusted by 50 or 100 Hertz.

11. The base station of claim 10, wherein the information is transmitted over the first and second antennas at different frequencies.

12. The base station of claim 9, wherein the information received from the mobile station is a frame error rate.

13. The base station of claim 9, wherein the information received from the mobile station is a signal-to-noise ratio.

14. The base station of claim 9, wherein the information is transmitted to the mobile station using code division multiple access transmission.

15. The base station of claim 9, wherein the mobile station is not explicitly informed of the adjustment.

16. The base station of claim 9, wherein the information is transmitted over the first antenna at a first frequency and the information is transmitted over the second antenna at the same first frequency.

17. The base station of claim 9, wherein the information is transmitted over the first antenna at a first frequency and the information is transmitted over the second antenna at a second frequency.

* * * * *